Dec. 20, 1938. H. J. DUNKELOW 2,140,619
CLUTCH
Filed Feb. 4, 1937 2 Sheets-Sheet 1

Inventor:
Henry J. Dunkelow.
by Davis, Lindsey, Smith & Shonts
Attys.

Dec. 20, 1938.  H. J. DUNKELOW  2,140,619
CLUTCH
Filed Feb. 4, 1937  2 Sheets-Sheet 2

Inventor;
Henry J. Dunkelow
by Davis, Lindsey, Smith & Shonts
Attys

Patented Dec. 20, 1938

2,140,619

UNITED STATES PATENT OFFICE 2,140,619

CLUTCH

Henry J. Dunkelow, Racine, Wis., assignor to Twin Disc Clutch Company, Racine, Wis., a corporation of Wisconsin Application February 4, 1937, Serial No. 123,947

6 Claims. (Cl. 192—69)

My invention relates to clutches and more particularly to that type in which the driving position of the device is established by a mechanical or positive actuation of the component elements in contrast to spring loading.

One object of my invention is to devise a clutch of the plate type which is mechanically engaged by operating mechanism that tends to release under the impulse of centrifugal force, thus insuring that the clutch will run free in the disengaged position.

A further object is to provide a clutch of the character indicated in which engagement is effected through the medium of relatively short, constant throw levers or arms whose releasing movement under the impulse of centrifugal force is definitely limited by contact with a portion of the clutch.

Additional objects are the securement in a compact clutch structure of an adequate mechanical advantage in the operating mechanism for insuring the application of the required clamping pressure, ease of adjustment as the plates wear, and a positive release of the clutch levers or arms during disengagement.

These and further objects of my invention will be set forth in the following specification, reference being had to the accompanying drawings, and the novel means by which said objects are effectuated will be definitely pointed out in the claims.

Figure 1:
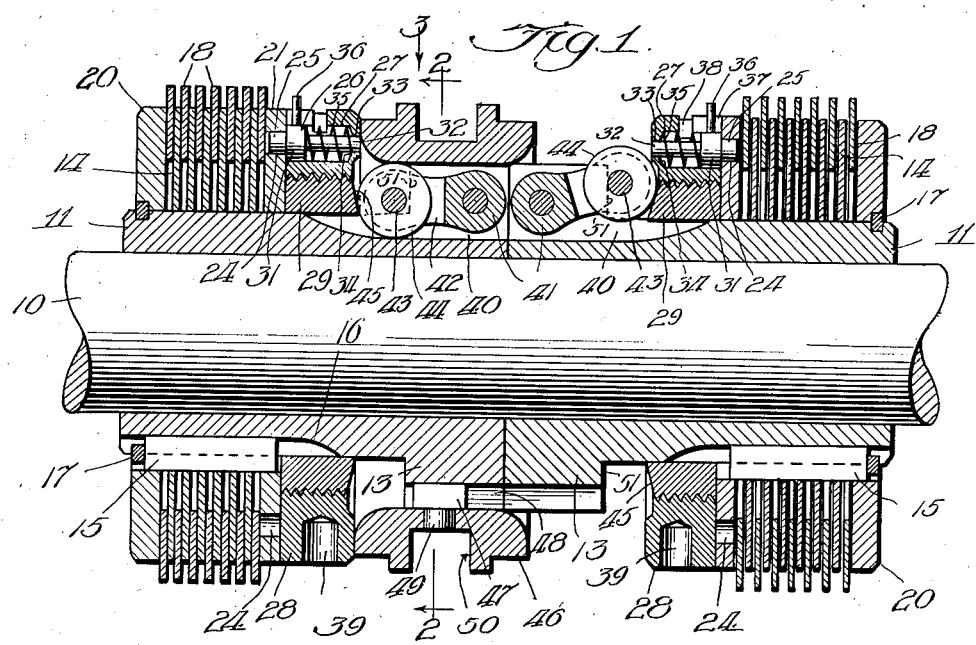
Figure 1 is a sectional elevation of one form of my improved clutch construction showing a dual arrangement of clutches which may be used to effect changes in speed or a reversal in rotation of the driven member.

Referring to Fig. 1, the numeral 10 designates a shaft constituting one of the rotary parts and which, for purpose of illustration, will be denoted as the driven member of the clutch construction. A pair of clutch hubs 11 is secured to the shaft by means of keys 12, said hubs being placed in abutting relation, as shown clearly in Fig. 1, and adjacent the opposite, outer ends of the hubs are mounted the clutch constructions which are identical in every respect. Accordingly, but one type of construction will be described, reference hereinafter being made to the left hand hub 11, as viewed in Fig. 1. Preferably, the inner or abutting end of each hub 11 is provided with an enlarged portion 13 for a purpose hereinafter explained.

A plurality of friction, driven disks 14 is secured to the hub 11 by means of a plurality of keys 15, of which there may be any desired number preferably circumferentially disposed in equispaced relation around the hub. The disks 14 are arranged for axial movement on the keys and endwise movement of the keys toward the right is prevented by the termination of the associated keyways 16 and toward the left by a split, spring ring 17 which is sutiably mounted in an annular recess provided in the hub. Alternately disposed with reference to the disks 14 is a plurality of friction, driving disks 18 having a plurality of circumferentially disposed teeth 19 for driving engagement with a second rotary part, which will be denoted as the driving member of the clutch, this part not being shown in the drawings.

Figure 5:
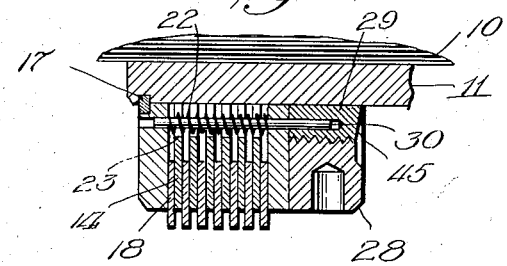
Fig. 5 is a fragmentary, sectional view of the left hand clutch, as viewed in Fig. 1, showing the relation of one of the releasing springs of the clutch to the friction plates thereof.

The disks 18 are also arranged for axial movement and the two sets of disks 14 and 18 are forced into frictional, driving engagement by a pair of clamping members constituted by a backing plate 20 and a pressure plate 21, the former contacting with the outer face of the group of disks and the latter with the inner face, as viewed in Fig. 1, both of these plates being secured to the hub 11 by the keys 15 so far as motion of rotation is concerned. The backing plate 20 constitutes a fixed abutment against which the indicated friction disks are clamped and endwise movement of this plate toward the left, as viewed in Fig. 1, is restrained by the ring 17. The plates 20 and 21 are actuated to clamp the friction disks by a mechanism hereinafter described and are retracted to a released position by a plurality of springs 22 (see Fig. 5), of which there may be any desired number spaced around the hub, and which operate within recesses 23 provided in the disks 14, the ends of the springs abutting at all times, whether in driving or released position, against the opposed, inner faces of the plates 20 and 21.

Figure 3:
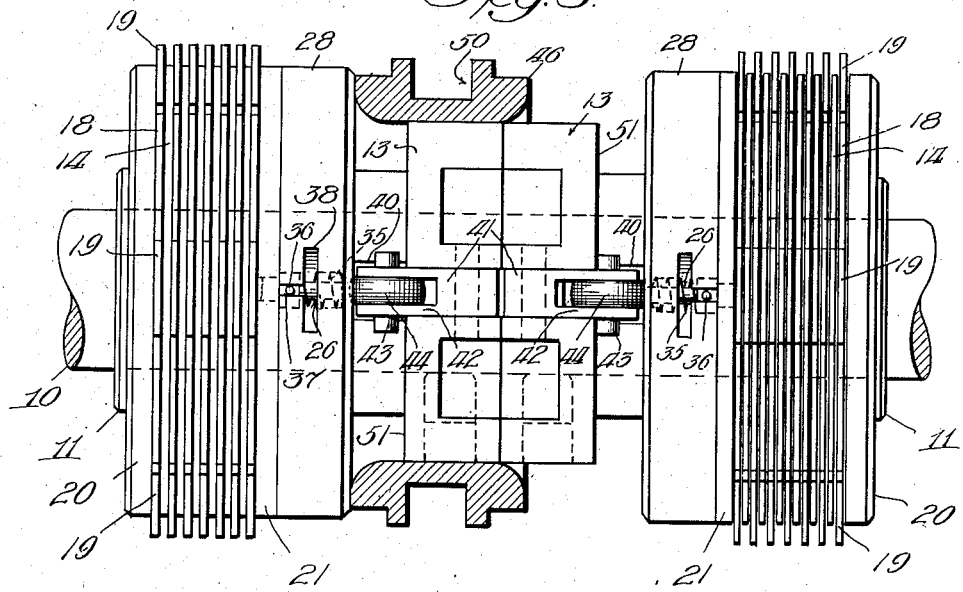
Fig. 3 is a plan view of the clutch construction shown in Fig. 1, looking in the direction of the arrow 3 in said figure.
Figure 4:
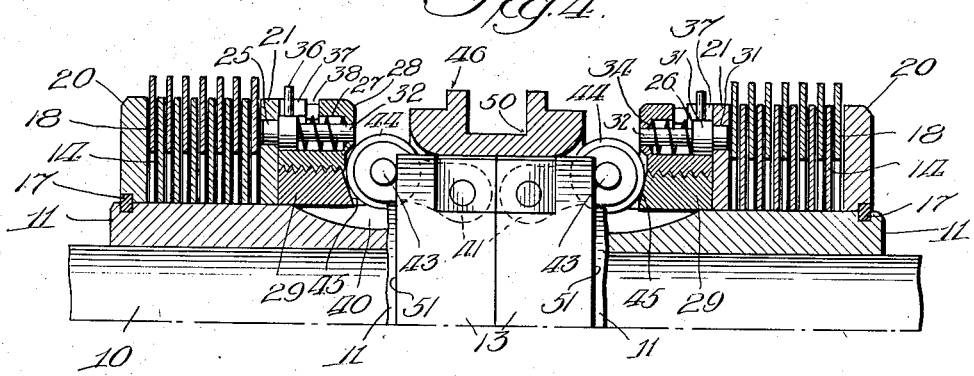
Fig. 4 is a fragmentary sectional view of the clutch, similar to that illustrated in Fig. 1, but showing the shifting collar occupying a position in which both clutches are out of engagement.

In addition to serving as a clamping member for the two groups of disks, the pressure plate 21 also functions to maintain the adjusting member of the clutch in any predetermined position. To this end, the plate 21 is provided with a plurality of circumferentially disposed holes 24 which are preferably equi-spaced around the annulus of the plate. These holes are intended to receive the reduced end 25 of a lock pin 26 which is carried and shiftable endwise in a cavity 27 provided in an adjusting ring 28 that is threaded on a floating ring 29 freely shiftable along the hub 11 and drivably connected to the plates 20 and 21 by means of a plurality of driving pins 30, each of which preferably passes through one of the release springs 22 and so additionally serves to guide the action of these springs. Each pin 30 is fixedly mounted in the floating ring 29, as by a driving fit therewith, and is freely slidable through the plates 20 and 21. The intermediate portion of the pin 26 is enlarged to provide an annular flange 31, while the portion of the pin to the right of the flange is reduced as at 32 and slidable in a hole 33 that is aligned with the cavity 27, but is formed with a smaller diameter, thus providing an internal shoulder 34. A coil spring 35 encircles the reduced portion 32, one end of the spring abutting against the shoulder 34 and the opposite end against the flange 31 to thereby normally force the lock pin outwardly of the adjusting ring, or toward the left, as viewed in Fig. 1. A finger grip pin 36 is mounted on the flange 31 and, when the lock pin is occupying the position shown in Fig. 1, extends outwardly of the adjusting ring through a slot 37 (see Fig. 3) that is only slightly wider than the diameter of the finger pin. The left end of the slot 37 terminates at the left face of the adjusting ring, while the opposite end of the slot communicates with an arcuate slot 38 that is transversely disposed with respect thereto and which also communicates with the cavity 27. In plan view, therefore, the slots 37 and 38 together form a T-shaped slot, the arrangement of the slot portions being such that, when the lock pin is occupying the position shown in Fig. 1, the sides of the slot 37 contact with the finger pin 36 to prevent any rocking movement of the locking pin, but, when the latter is retracted to a position wherein it is free from one of the holes 24 in the pressure plate 21, the locking pin may be rotated about its axis to place the finger pin 36 in one of the arms of the arcuate slot 38, thereby retaining the locking pin in retracted position and permitting an adjustment of the ring 28. In connection with the foregoing description, it should be remembered that the clutch release springs 22 always exert pressure against the pressure plate 21, therefore always maintaining the latter plate against the co-acting face of the adjusting ring 28. The locking pin construction, as disclosed in this application, is substantially identical with that illustrated and claimed in United States Letters Patent No. 1,988,748, dated January 22, 1935.

Figure 2:
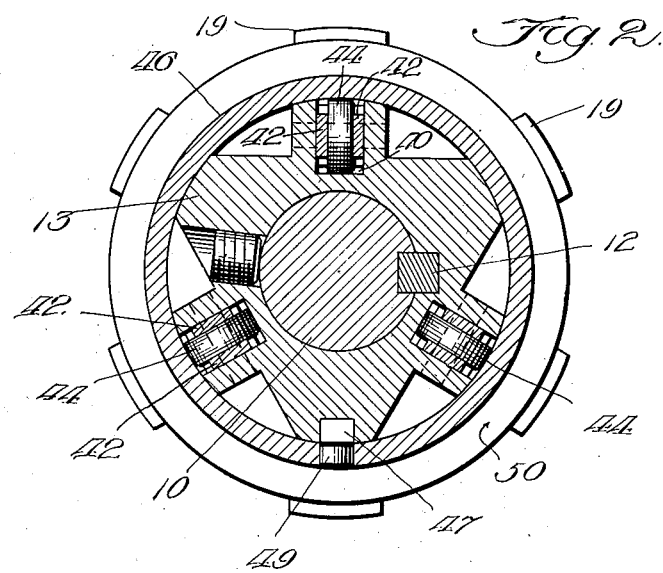
Fig. 2 is a section along the line 2—2 in Fig. 1, looking in the direction of the arrows.

As a means of actuating the clutch parts to driving position, a plurality of radial slots 40 are cut inwardly of the hub in the enlarged portion 13 thereof and preferably in the equi-spaced relation illustrated in Fig. 2, three such slots being shown. One end of a clutch arm 41 is pivotally mounted in each of these slots adjacent the right end of the hub and the opposite end of each arm is bifurcated to provide a pair of side plates 42 between which is bridged a pintle 43 that rotatably supports a roller 44 between the side plates. For a purpose presently explained, the opposite ends of each pintle 43 extend beyond the side plates 42, as clearly shown in Fig. 3, and each roller is adapted to bear against an inclined, end face 45 provided on the floating ring 29.

A shifting collar 46 is slidably mounted on the enlarged portion 13 of the hub in encircling relation to the clutch arms 41 and this collar is drivably connected to the hub through the medium of a key 47 that is slidably mounted in a keyway 48 and which key is provided with a stub portion 49 that is received within a suitable aperture provided in the collar. This collar 46 may be additionally provided with an annular channel 50 for the reception of the trunnions of the customary shifting fork (not shown).

In operation, it is contemplated that the driving disks 18 on the left hand hub 11 will be connected to a suitable driving member, which will be characterized by one condition of operation as regards direction of rotation and speed of rotation, while the disks 18 on the right hand hub 11 will be driven by a second member which may be characterized either by a motion of rotation opposite to that being applied to the disks 18 on the left hand hub, or by a motion of rotation in the same direction, but at a different speed. Accordingly, by this dual type of clutch construction, the shaft 10 may be subjected to reversals of rotation as desired, or it may be subjected to changes in rotary speed, dependent upon the character of the driving members which actuate the respective driving disks 18.

Assuming that the clutch construction effects reversals in the motion of rotation of the shaft 10, it will be obvious from an inspection of Fig. 1 that the left hand clutch is in driving engagement with the right hand clutch in released position, due to the free action of the springs 22. If it is then desired to effect a reversal of this condition, the shifting collar 46 is moved toward the right, as viewed in Fig. 1, to thereby engage the rollers 44 on the arms of the right hand clutch and depress these arms inwardly, or toward the axis of the shaft 10. This movement brings each of the indicated rollers into engagement with the inclined face 45 of the right hand floating ring 29 and thereby shifts this ring and the associated adjusting ring 28 and pressure plate 21 toward the right and thus clamps the group of friction disks against the fixed abutment constituted by the backing plate 20.

As the shifting collar 46 moves toward the right, the left hand rollers 44 are freed of restraint by the collar 46 and so, under the impulse of centrifugal force acting in conjunction with the releasing movement of the springs 22 operating through the floating ring 29, move the clutch arms 41 to the outward position, indicated by the right hand clutch arms in Fig. 1. This releasing movement of the left hand clutch arms 41 is limited by engagement of the extended ends of each pintle 43 with the adjacent shoulders 51 provided on the clutch portions 13, so that when either clutch is in a released position, but with the hub 11 rotating, those arms which form a part of the released clutch are definitely held in a position at which they may be easily engaged by the shifting collar 46.

As the friction disks 14 and 18 wear, it becomes necessary to readjust the initial position of the pressure plate 21, owing to the fixed range of movement of the clutch arms 41. This adjustment is effected by means of the adjusting rings 28 which are rotated in the correct direction to axially move the pressure plate 21 by the insertion of a suitable tool in one of the holes 39, of which there may be provided a plurality extending inwardly from the periphery of the ring. Prior to such an adjustment, of course, the locking pins 26 must be retracted from engagement with the pressure plate.

Except during these periods of adjustment, the pressure plate 21 functions as a base for the release springs 22 and also serves, owing to the pressure of these springs and the engagement between the plate and the locking pin, to effectively lock the adjusting ring in any desired position and this adjustment is maintained regardless of the reversing or change speed movements of the clutch mechanism, which might otherwise tend to shift the ring from its adjusted position owing to the effect of inertia or momentum of the parts. In other words, the release springs 22 serve the dual purpose of separating and holding the backing and pressure plates apart, as well as maintaining through the pressure plate the adjusted position of the adjusting ring.

The foregoing clutch construction may be used in the dual arrangement, as illustrated, or singly as desired, and, in either case, provides a very compact construction that does not sacrifice any of the mechanical advantages normally required in devices of this type. The relatively short clutch arms eliminate the disadvantages commonly associated with long, springy arms that are often used with this type of construction, but without weakening the clutch in any particular. One of the most important features of my improved construction resides in the manner of definitely limiting the releasing movement of the clutch arms, thus providing a construction which is wholly free from any rattling tendency. Moreover, when either clutch is in driving position, the releasing tendency of the clutch arms is in a direction that is substantially normal to the releasing direction of the shifting collar, so that there is no likelihood of this collar being inadvertently disengaged by the operation of the clutch.

I claim:

1. In a clutch, the combination of friction members attachable to separate rotary parts and adapted for driving engagement with each other, a backing plate and a clamping plate for effecting the engagement of the members, the backing plate acting as an abutment against which the friction members are clamped, an adjusting ring for contacting the clamping plate, a floating ring acting as a carrier for the adjusting ring, arms swingable inwardly for engagement with the floating ring to clamp the members in driving position, a shiftable collar for actuating the arms, and separate means for limiting the outward movement of the arms under the impulse of centrifugal force when in released position.

2. In a clutch, the combination of friction members attachable to separate rotary parts and adapted for driving engagement with each other, one of the parts constituting a hub, a backing plate and a clamping plate mounted on the hub, the backing plate acting as an abutment against which the friction members are clamped, an adjusting ring for contacting the clamping plate, a floating ring acting as a carrier for the adjusting ring, a plurality of arms spaced around the hub, each arm being pivoted on the hub and having a part for engaging the floating ring to clamp the members in driving position, and a shiftable collar for actuating the parts.

3. In a clutch, the combination of friction members attachable to separate rotary parts and adapted for driving engagement with each other, one of the parts constituting a hub having a plurality of shoulders, a backing plate and a clamping plate mounted on the hub, the backing plate acting as an abutment against which the friction members are clamped, an adjusting ring for contacting the clamping plate, a floating ring acting as a carrier for the adjusting ring, a plurality of arms spaced around the hub, each arm being pivoted on the hub and having a part for engaging the floating ring to clamp the members in driving position, a shiftable collar for actuating the arms, and means provided on each arm adapted to engage with an adjacent shoulder to limit the outward movement of the arm under the impulse of centrifugal force when in released position.

4. In a clutch, the combination of friction members attachable to separate rotary parts and adapted for driving engagement with each other, one of the parts constituting a hub having a plurality of shoulders, a backing plate and a clamping plate mounted on the hub, the backing plate acting as an abutment against which the friction members are clamped, an adjusting ring for contacting the clamping plate, a floating ring acting as a carrier for the adjusting ring, a plurality of arms spaced around the hub, each arm being pivoted on the hub and having a pintle mounted roller for engagement with the floating ring to clamp the members in driving position, and a shiftable collar for actuating the arms, each pintle being engageable with a shoulder to limit the releasing movement of the associated arms under the impulse of centrifugal force when the clutch is in released position.

5. In a clutch, the combination of friction members attachable to separate rotary parts and adapted for driving engagement with each other, a backing plate and a clamping plate held against relative rotation for effecting the engagement of the members, the backing plate acting as an abutment against which the friction members are clamped, springs interposed between the plates, an adjusting ring for contacting the clamping plate, a floating ring acting as a carrier for the adjusting ring, pivoted arms engageable with the floating ring to clamp the members in driving position, and a shiftable collar for actuating the arms, the relation of the arms being such that the pressure of the springs, when the clutch is in driving position, causes a pressure of the arms against the collar in directions substantially normal to the actuating movement thereof.

6. In dual clutch construction, the combination of a hub having an annular enlargement providing spaced shoulders intermediate the ends thereof, a clutch mounted at each end of the hub, each clutch comprising two sets of friction members adapted for driving engagement with each other, one set being connected to the hub and the other set being attachable to a separate rotary part, a backing plate and a clamping plate mounted on the hub, the backing plate acting as an abutment against which the associated friction members are clamped, an adjusting ring contacting the clamping plate, a floating ring acting as a carrier for the adjusting ring, and two separate groups of arms spaced around the hub, the arms of each group being pivoted on the hub and each arm having a part for engaging the adjacent floating ring to clamp the associated members in driving position, a shiftable collar for selectively actuating either group of arms, and means provided on the arms of each group adapted to engage with an adjacent shoulder to limit the outward movement of the groups of arms under the impulse of centrifugal force when the collar is occupying a neutral position.

HENRY J. DUNKELOW.